United States Patent
Campbell et al.

(10) Patent No.: US 7,642,914 B2
(45) Date of Patent: Jan. 5, 2010

(54) AUTO-LOCATING SYSTEM AND METHOD FOR DATA CENTER MAPPING AND MONITORING

(75) Inventors: Levi A. Campbell, Poughkeepsie, NY (US); Richard C. Chu, Hopewell Junction, NY (US); Michael J. Ellsworth, Jr., Lagrangeville, NY (US); Madhusudan K. Iyengar, Woodstock, NY (US); Robert E. Simons, Pouhkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 11/855,185

(22) Filed: Sep. 14, 2007

(65) Prior Publication Data
US 2009/0072967 A1    Mar. 19, 2009

(51) Int. Cl.
*G08B 13/14* (2006.01)
(52) U.S. Cl. .............. 340/572.1; 340/539.13; 340/825.36
(58) Field of Classification Search .......... 340/572.1, 340/539.13, 539.1, 825.36, 825.49; 235/462.13, 235/385; 715/772
See application file for complete search history.

(56) References Cited

U.S. PATENT DOCUMENTS

| | | | | |
|---|---|---|---|---|
| 5,455,409 A | * | 10/1995 | Smith et al. | 235/385 |
| 7,071,825 B2 | | 7/2006 | VoBa | |
| 7,350,715 B2 | * | 4/2008 | Pradhan et al. | 235/492 |
| 2009/0070697 A1 | * | 3/2009 | LaForest | 715/772 |

* cited by examiner

*Primary Examiner*—Toan N Pham
(74) *Attorney, Agent, or Firm*—Geraldine Monteleone, Esq.; Kevin P. Radigan, Esq.; Heslin Rothenberg Farley & Mesiti P.C.

(57) ABSTRACT

Automated locating of electronics racks within a data center room is provided. The automated approach employs n wireless identification units associated with respective electronics racks of the data center, and first and second transceiver units positioned within the data center along a common plane at known X,Y locations. A monitor unit is in communication with the transceiver units, and automatically determines X,Y location within the data center room of each respective electronics rack employing, in part, first time differentials between transmission of a first broadcast signal by the first transceiver unit and receipt of response signals from the wireless identification units, second time differentials between transmission of a second broadcast signal from the second transceiver unit and receipt of response signals thereto from the wireless identification units, and the known X,Y locations within the data center of the transceiver units.

20 Claims, 5 Drawing Sheets

AUTO-LOCATING SYSTEM AND METHOD FOR DATA CENTER MAPPING AND MONITORING

TECHNICAL FIELD

The present invention relates in general to computer room or data center monitoring and management, and more particularly, to an auto-locating system and method for automated locating and monitoring of, for example, rack-mounted assemblages of individual electronics units, such as rack-mounted computer server units within a data center.

BACKGROUND OF THE INVENTION

The power dissipation of integrated circuit chips, and the modules containing the chips, continues to increase in order to achieve increases in processor performance. This trend poses a cooling challenge at both the module and system levels. Increased airflow rates are needed to effectively cool high powered modules and to limit the temperature of the air that is exhausting into the data center.

In many large server applications, processors, along with their associated electronics (e.g., memory, disk drives, power supplies, etc.), are packaged in removable drawer configurations stacked within a rack or frame. In other cases, the electronics may be in a fixed location within the rack or frame. Often, the physical location of a rack or frame may change within a data center as the result of a reconfiguration of the data center.

Typically, the components of an electronics rack are cooled by air moving in parallel airflow paths, usually front-to-back, and propelled by one or more air-moving devices (e.g., fans or blowers). In some cases, it may be possible to handle increased power dissipation within a single drawer by providing greater airflow, through the use of a more powerful air-moving device or by increasing the rotational speed (i.e., RPMs) of an existing air-moving device. However, this approach may be problematic at the rack level in the context of a computer installation (i.e., data center).

SUMMARY OF THE INVENTION

Active monitoring and management of electronics racks within a computer room data center are advantageous. Provided herein is an auto-locating system and method for facilitating data center mapping and monitoring, for example, of X,Y positions of electronics racks within the data center.

In one aspect, a locating system for a data center is provided which includes n wireless identification units, a first transceiver unit and a second transceiver unit, and a monitor unit in communication with the first transceiver unit and second transceiver unit, wherein n≧1. At least one wireless identification unit of the n wireless identification units is associated with at least one structure of a plurality of structures of the data center. Each transceiver unit is located within the data center along a common plane disposed at known X,Y locations within the data center. When operational, each transceiver unit transmits a broadcast signal to the wireless identification units and receives responsive thereto, response signals from the wireless identification units. The monitor unit automatically determines an X,Y location within the data center of the at least one structure of the plurality of structures employing, in part, a first time differential(s) between transmission of a first broadcast signal by the first transceiver unit and responsive thereto, receipt at the first transceiver unit of at least one response signal from the at least one wireless identification unit associated with the at least one structure, and a second time differential(s) between transmission of a second broadcast signal by the second transceiver unit and responsive thereto, receipt at the second transceiver unit of at least one response signal from the at least one wireless identification unit associated with the at least one structure, as well as the known X,Y locations within the data center of the first and second transceiver units.

In a further aspect, a data center is provided which includes a plurality of electronics racks disposed within the data center and a locating system for automated locating of the electronics racks within the data center. The locating system includes n wireless identification units, wherein n≧2, each wireless identification unit being associated with a respective electronics rack of the data center and each electronics rack having associated therewith at least one wireless identification unit of the n wireless identification units; a first transceiver unit and a second transceiver unit positioned within the data center along a common plane at known X,Y locations within the data center, wherein when operational, each transceiver unit transmits a broadcast signal to the n wireless identification units, and receives responsive thereto, response signals from the n wireless identification units; and a monitor unit in communication with the first transceiver unit and the second transceiver unit for automatically determining an X,Y location within the data center of each wireless identification unit employing, in part, first time differentials between transmission of the first broadcast signal by the first transceiver unit and responsive thereto, receipt at the first transceiver unit of response signals from the n wireless identification units, and second time differentials between transmission of the second broadcast signal by the second transceiver unit and responsive thereto, receipt at the second transceiver unit of response signals from the n wireless identification units, as well as the known X,Y locations within the data center of the first and second transceiver units.

In a further aspect, an electronics rack locating method for a data center is provided, which includes: providing an X,Y locating system for the data center, the providing including: associating n wireless identification units with electronics racks of the data center, wherein n≧2, each wireless identification unit being associated with a respective electronics rack of a plurality of electronics racks of the data center, and each electronics rack of the plurality of electronics racks having associated therewith at least one wireless identification unit of the n wireless identification units; disposing a first transceiver unit and a second transceiver unit within the data center along a common plane at known X,Y locations within the data center; and providing a monitor unit in communication with the first transceiver unit and the second transceiver unit for automatically determining an X,Y location within the data center of each electronics rack of the plurality of electronics racks; and the method further includes: transmitting by the first transceiver unit a first broadcast signal to the n wireless identification units, and responsive thereto, receiving at the first transceiver unit response signals from the n wireless identification units associated with the electronics racks to be located; determining first time differentials between transmission of the first broadcast signal by the first transceiver unit and receipt at the first transceiver unit of the respective response signals from the n wireless identification units associated with the electronics racks; transmitting a second broadcast signal from the second transceiver unit to the n wireless identification units, and responsive thereto, receiving at the second transceiver unit response signals from the n wireless identification units associated with the electronics racks to be located; determining second time differentials between transmission of the second broadcast signal by the second transceiver unit and receipt at the second transceiver unit of the respective response signals from the n wireless identification units associated with the electronics racks; and employing the first time differentials and the second time differentials, as well as the known X,Y locations within the data center of the first transceiver unit and the second transceiver unit to automatically determine the X,Y locations within the data center of the n wireless identification units, and hence the respective electronics racks.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
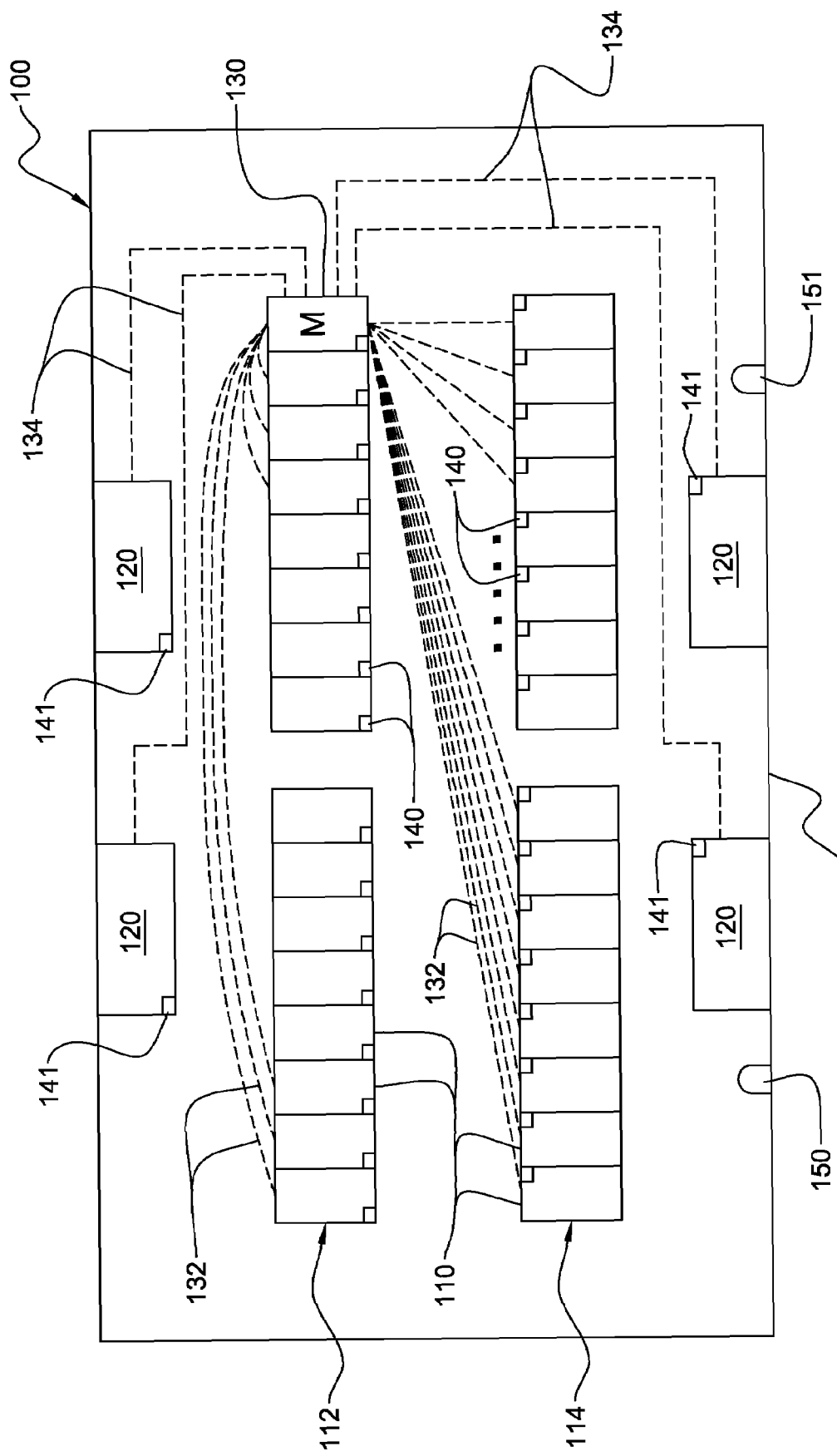
FIG. 1 depicts one embodiment of a data center room layout wherein selected structures within the data center are to be physically located, employing an auto-locating system and method, in accordance with one or more aspects of the present invention.

Current server management techniques allow an administrator to monitor system temperatures and power usage remotely through a network, and to identify by MAC or IP address which server is associated with each piece of information. However, it is not currently possible for a facilities manager to ascertain the physical location of an electronics rack or other structure with the data center without manually mapping out (e.g., via CAD software) locations, and MAC or IP addresses, of each rack. Thus, in order to effectively utilize load sharing and utilization optimization techniques to manage power and thermal loading across electronics racks within a data center, an automated technique is disclosed herein to obtain X,Y rack location information and to combine that information with, for example, power and thermal utilization data to allow an IT facility manager to more effectively monitor and manage the data center.

More particularly, a wireless, automated structure locating system and method are disclosed herein for providing physical location data to be linked with currently available power, thermal, and utilization data for structures, such as electronics racks, within a data center. The system and method disclosed herein automatically determine the physical X,Y location of electronics racks within a data center room without the need for manual mapping of the electronics racks by a facility manager, which may include recording the individual ID numbers and locations of electronics racks within the data center and then manually or otherwise correlating this information with Internet Protocol (IP) or Media Access Control (MAC) addresses (e.g., each time a data center undergoes reconfiguration). In the embodiments described herein, the wireless identification units are based on radio frequency identification (RFID) technology, and in one example, comprise RFID tags.

RFID technology has been employed in warehousing and retail applications to identify unique goods. In a typical RFID system, individual objects are equipped with a tag, and the tag contains a transponder with a digital memory chip that is given a unique electronic code. The reader or interrogator consists of an antennae packaged with a transceiver and decoder. The reader emits a signal activating the RFID tag, receives a return signal from the RFID tag, and then decodes the data encoded in the tag's integrated circuit. The resultant data is passed to a host computer, where application logic processes the data, and performs various filtering operations to reduce one or more received signals to a useful data set.

In the disclosed invention, the time between transmission of a broadcast signal and receipt of a return response signal from a particular RFID identification unit is measured and used to determine the magnitude of the distance between the transceiver and the identification unit. This is ascertained for each of two transceivers only, and the two determined distances are employed in ascertaining the X,Y location of the identification unit within the data center room, and hence the X,Y location of the respective electronics rack with which the identification unit is associated.

FIG. 1 depicts one embodiment of a wireless automated locating system installed within a data center room 100. As shown, data center room 100 includes a plurality of electronics racks 110 aligned in rows 112, 114 with, for example, the air inlet sides of the electronics racks facing in opposing relation and defining a cold air aisle therebetween. Conventionally, in a raised floor implementation, perforated floor tiles (not shown) are disposed in the cold air aisle between the rows 112, 114 of electronics racks 110 for introducing cold air to the air inlet sides of the racks. Air moving devices within the electronics racks propel ingressing air from the air inlet side of each rack to the air outlet side thereof.

In the data center embodiment illustrated, a plurality of computer room air-conditioning units 120 are also disposed within the data center room 100. Electronics racks 110 and computer room air-conditioning units 120 are in communication 132, 134 with (in one example) one or more monitor units 130 associated with one or more host computers disposed within one or more electronics racks of the data center. Conventionally, rack power, blower speed, rack airflow rate, rack air inlet temperature, rack air outlet temperature, server microprocessor diode temperatures, and/or other miscellaneous temperatures for DIMMs, disc drives, etc., for each rack and/or air-conditioning unit (as relevant), may be obtained and forwarded to the monitoring unit. By way of example, rack data from a server system level logic program, such as PowerExecutive™, offered by International Business Machines Corporation of Armonk, N.Y., may be employed in generating and forwarding the data to the monitoring unit. As noted above, however, absent from this conventionally generated data is the physical location of the respective electronics rack within the data center room. Thus, disclosed herein is an automated locating system for providing this information, for example, to locate each electronics rack within the data center room, and facilitate correlating of such information with the conventionally accumulated information to provide a more holistic view of data center room operations.

The locating system disclosed herein includes (in one embodiment) a first radio transceiver unit 150 and a second radio transceiver unit 151 disposed along a common plane 101, which in one example, is co-planar with one wall 101 of the data center room 100. The n wireless identification units (in one example, RFID identification units or tags) are affixed to each structure within the data center room for which automated, physical location information is desired.

In the example illustrated in FIG. 1, wireless identification units 140 of the locating system are associated with respective electronics racks 110 of the data center, and wireless identification units 141 are associated with respective computer room air-conditioning units 120 of data center room 100. As noted, within monitor unit rack 130, a host computer may be provided with conventional system management logic for monitoring/recording power consumption and air inlet/outlet temperatures for each electronics rack and for each computer room air-conditioning unit. Further, as described in greater detail below with reference to FIGS. 2 & 3, logic is advantageously provided therein for automated X,Y locating of the wireless identification units, and hence the associated electronics racks, within the data center room. The automated locating employs, in part, first time differentials between transmission of a first broadcast signal by the first transceiver unit and responsive thereto, receipt at the first transceiver unit of response signals from the wireless identification units associated with the electronics racks within the data center, and second time differentials between transmission of a second broadcast signal by the second transceiver unit and responsive thereto, receipt at the second transceiver unit of response signals from the wireless identification units associated with the electronics racks, as well as known X,Y locations within the data center of the first and second transceiver units.

Figure 2:
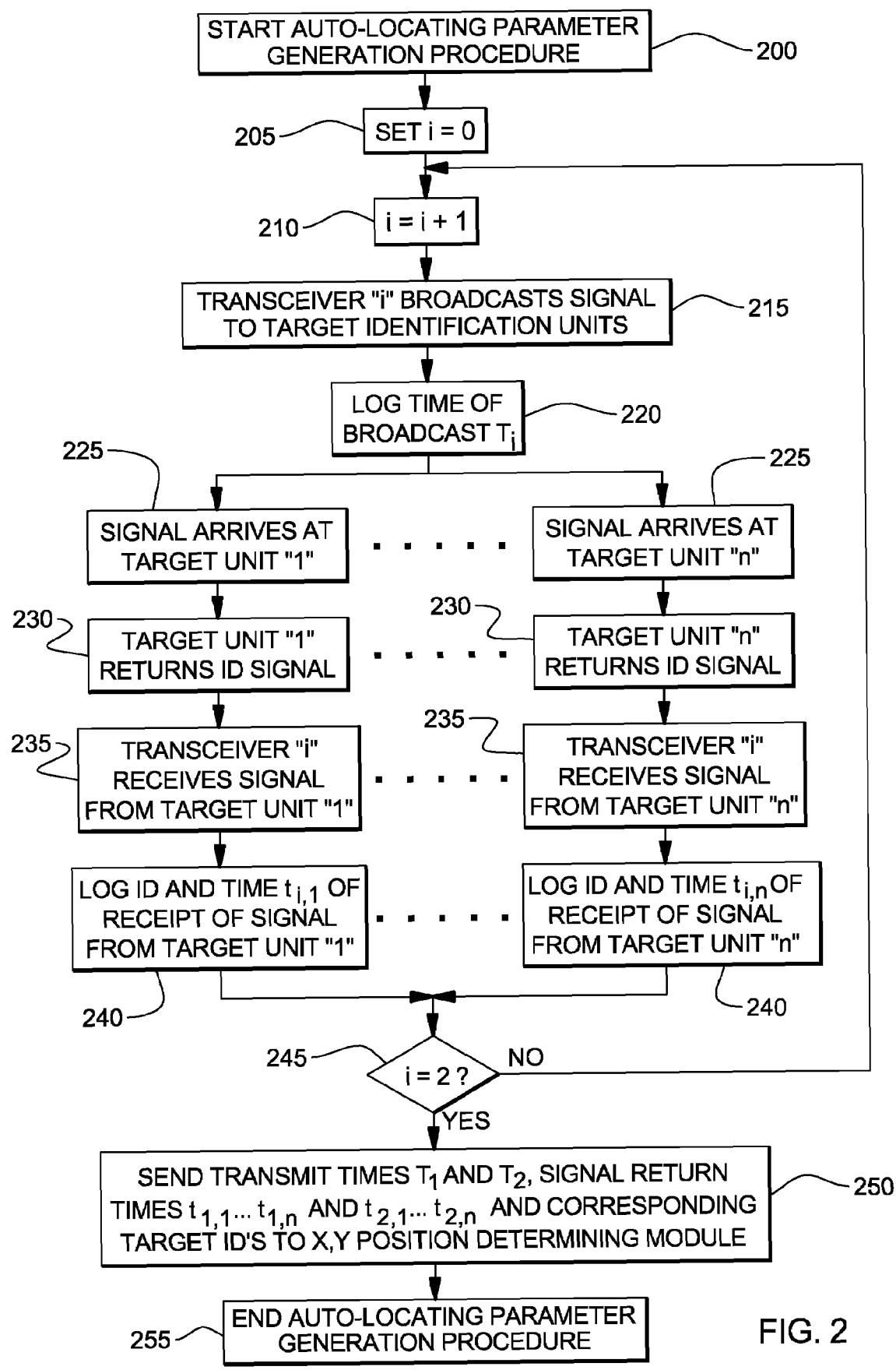
FIG. 2 depicts one embodiment of logic for obtaining auto-locating parameters useable in physically locating identification units, in accordance with one or more aspects of the present invention.

FIG. 2 depicts one embodiment of logic for obtaining auto-locating parameters usable in physically locating identification units, and hence electronics racks or computer room air-conditioning units, within a data center room. In one embodiment, upon command of system management logic, disposed (for example) within a host computer associated with monitor unit 130, the auto-location parameter generating procedure of FIG. 2 is initiated 200. A variable i is set equal to zero 205 and then incremented by 1 210. Transceiver unit i, which in a first pass through the protocol is the first transceiver unit, transmits a first broadcast signal to the wireless, target identification units 215. The time $T_1$ of transmission of this broadcast signal is logged 220. Upon receipt of the first broadcast signal 225, each target identification unit of the n identification units emits a unique ID response signal (inclusive, e.g., of an IP or MAC address) 230. The emitted ID response signals from the n identification units are received back at the first transceiver unit 235 and the times of receipt of the ID response signals from the target identification units $t_{1,1} \ldots t_{1,n}$ are logged 240.

The first transceiver unit is then turned off and the second transceiver unit is activated. This is accomplished by the logic determining whether the variable i equals 2 245, and if "no", then variable i is incremented 210 and the second transceiver unit transmits a second broadcast signal to the target identification units 215. The time of transmitting $T_2$ the second broadcast signal by the second transceiver unit is logged 220, and upon receipt of the second electronic broadcast signal 225, each wireless identification unit again emits its unique ID response signal 230, which are received back at the second transceiver unit 235. The times of receipt $t_{2,1} \ldots t_{2,n}$ by the second transceiver unit of each ID response signal from the wireless identification units are logged. Since i equals 2, the resultant set of broadcast signal times $T_1$, $T_2$, response return times $t_{1,1} \ldots t_{1,n}$ and $t_{2,1} \ldots t_{2,n}$, and the unique target unit identifiers are sent to positioning determining logic of the monitor unit 250, which ends the auto-locating parameter generation procedure 255.

Figure 3:
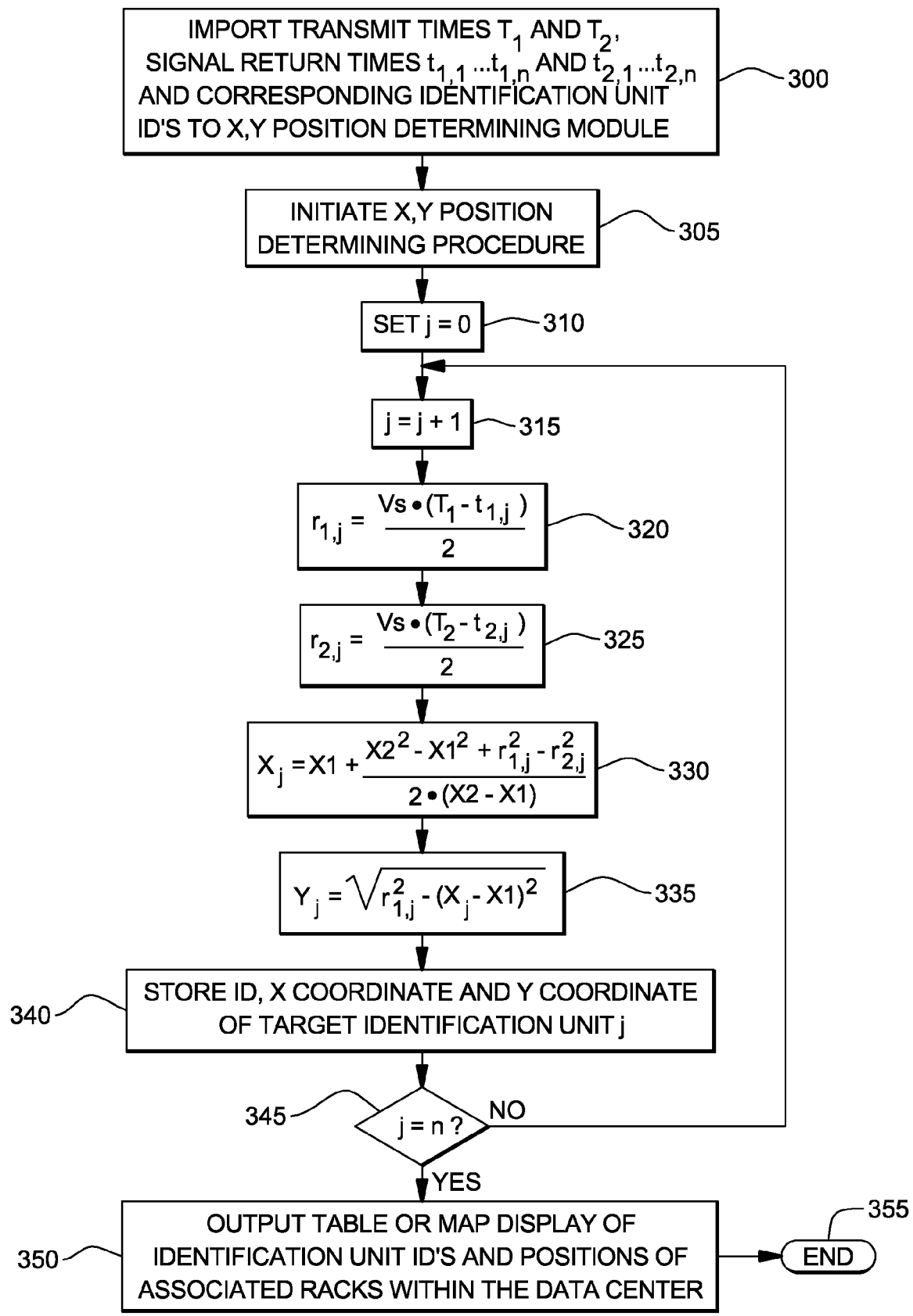
FIG. 3 depicts one embodiment of auto-locating logic for determining an X,Y coordinate of each identification unit within the data center employing the obtained auto-locating parameters of FIG. 2, in accordance with one or more aspects of the present invention.
Figure 4:
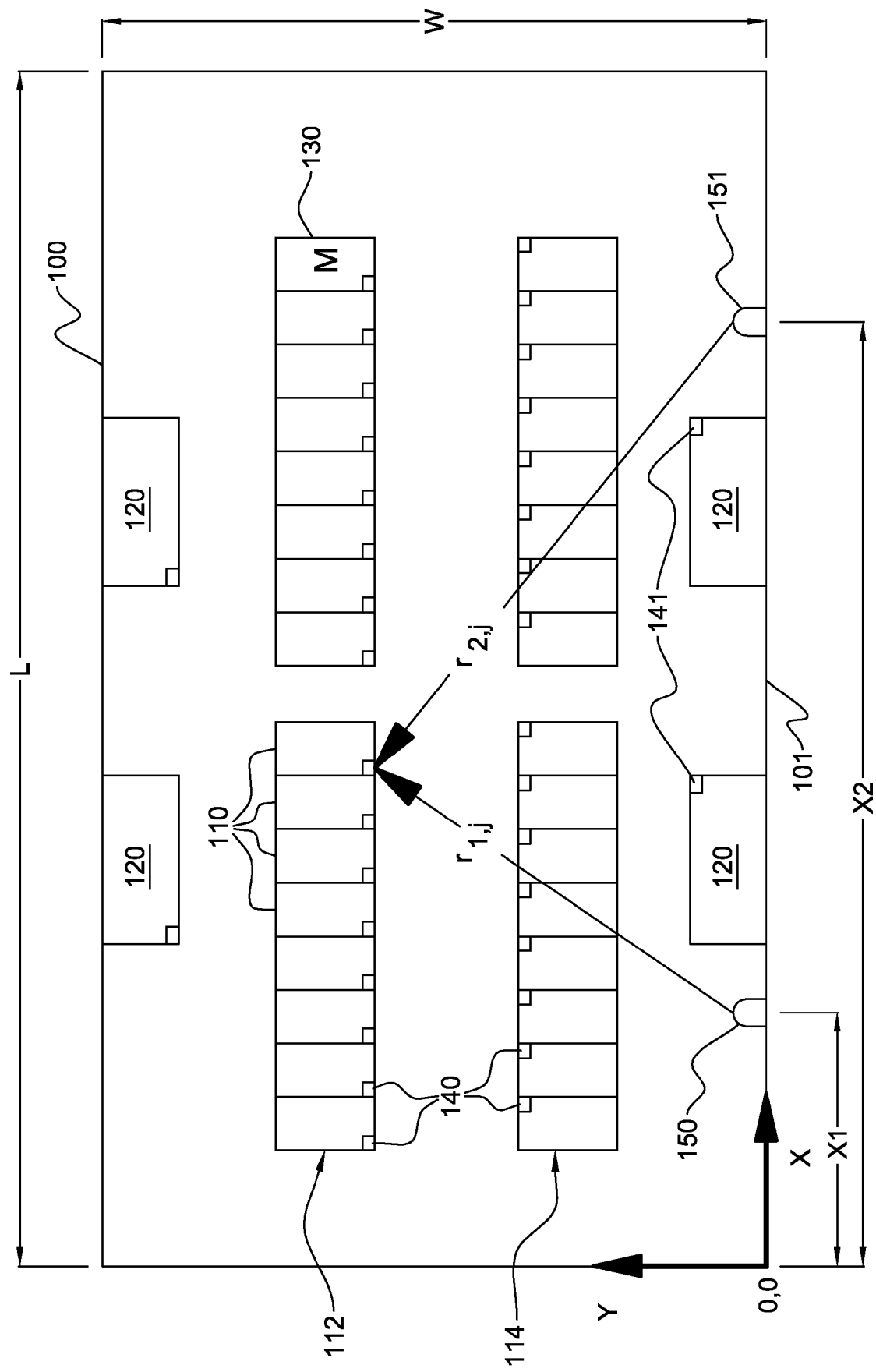
FIG. 4 illustrates the data center room layout of FIG. 1, and the auto-locating protocol of FIG. 3 for locating a $j^{th}$ wireless identification unit and associated electronics racks within the data center room, in accordance with one or more aspects of the present invention.

Employing the logic of FIG. 3, the position determining protocol of the monitoring unit determines the X,Y coordinates of each identification unit relative to an origin point of the data center room, illustrated in FIG. 4 as 0,0. In particular, the transmit times $T_1$ and $T_2$, signal return times $t_{1,1} \ldots t_{1,n}$ and $t_{2,1} \ldots t_{2,n}$, and corresponding identification unit IDs are imported to the X,Y position determining logic of the monitoring unit 300, and the position determining procedure is initiated 305, with the variable j initially being set to zero 310, and then incremented by 1 315. First radius logic determines 320 the distance $r_{1,j}$ from the first transceiver unit to the $j^{th}$ wireless identification unit as follows:

$$r_{1,j} = \frac{V_s \cdot (T_1 - t_{1,j})}{2}$$

where $V_s$ equals the wireless signal propagation velocity (for example, radio signal propagation velocity $3 \times 10^8$ m/s), divided by one-half of the difference in time between the time of transmission ($T_1$) from the first transceiver unit and the time of receipt ($t_{1,j}$) of the return response signal at the first transceiver unit from the $j^{th}$ wireless identification unit. Similarly, second radius logic determines 325 the distance $r_{2,j}$ from the second transceiver unit to the $j^{th}$ wireless identification unit as follows:

$$r_{2,j} = \frac{V_s \cdot (T_2 - t_{2,j})}{2}$$

The X,Y location within the data center room of the $j^{th}$ wireless identification unit is then determined, with the $X_j$ location being determined 330 by:

$$X_j = X1 + \frac{X2^2 - X1^2 + r_{1,j}^2 - r_{2,j}^2}{2 \cdot (X2 - X1)}$$

and the $Y_j$ location of the $j^{th}$ wireless identification unit being determined 335 by:

$$Y_j = \sqrt{r_{1,j}^2 - (X_j - X1)^2}$$

wherein:
$X_j$=the X coordinate location of the $j^{th}$ wireless identification unit within the data center room,
$Y_j$=the Y coordinate location of the $j^{th}$ wireless identification unit within the data center room, X1=the X coordinate location of the first transceiver unit along the common plane relative to an X,Y origin point within the data center through which the common plane passes, and X2=the X coordinate location of the second transceiver unit along the common plane relative to the X,Y origin point within the data center.

The distance $r_{1,j}$ from the first transceiver unit to the $j^{th}$ wireless identification unit, and distance $r_{2,j}$ from the second transceiver unit to the $j^{th}$ wireless identification unit, as well as distances X1 and X2 of the first and second transceiver units, respectively, along the common plane (in this example, the X axis of the data center room grid), are illustrated in FIG. 4 relative to the data center layout of FIG. 1, wherein transceivers 150, 151 are again mounted to common wall 101 of the data center room 100. The data center room 100 includes a plurality of electronics racks 110 aligned in rows 112, 114 and a plurality of computer room air-conditioning units 120. Wireless identification units 140, 141 are associated with the electronics racks and computer room air-conditioning units, and a monitor unit 130 resides on one or more systems disposed within one or more electronics racks of the data center room.

After determining the physical X,Y location of the $j^{th}$ wireless identification unit within the data center room, the ID of the $j^{th}$ wireless identification unit is stored, along with the X and Y coordinates of the identification unit 340. Logic determines whether the variable j equals n 345 (wherein n is the number of target identification units to be X,Y located within the data center), and if "no", then the variable j is incremented to determine the X,Y coordinate location of a next wireless identification unit within the data center room. Once all n wireless identification units have been physically located within the data center room, the logic outputs a table or mapped display of the identification unit IDs and their positions, as well as representations of the associated racks or air-conditioning units within the data center room 350, which completes the position determining protocol 355. Representations of the associated electronics racks and/or computer room air-conditioning units may be automatically generated by employing, for example, a saved X,Y indication of the location within each respective rack or air-conditioning unit of the target identification unit, as well as relevant dimensions of the respective electronics racks and air-conditioning units.

Figure 5:
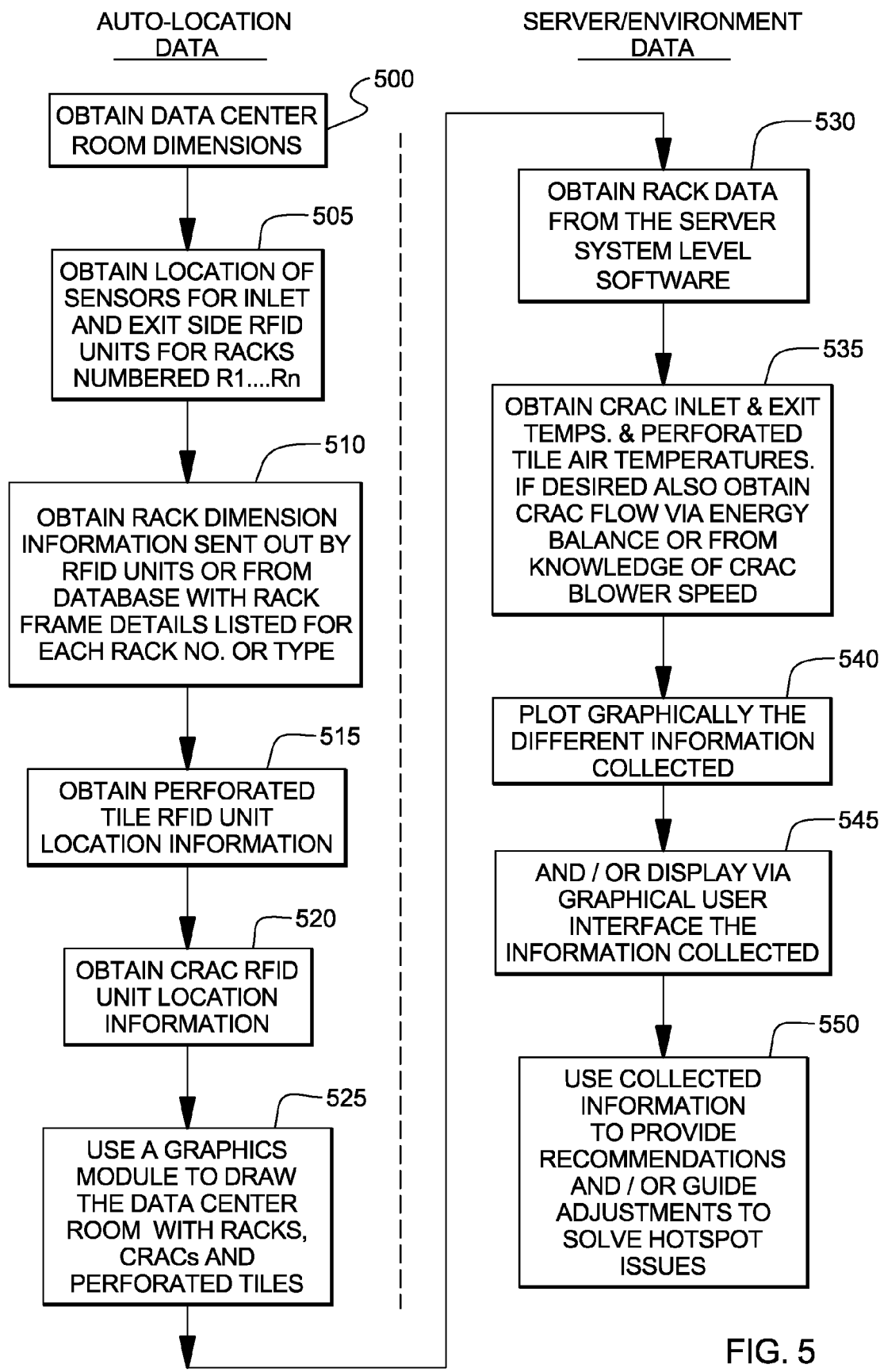
FIG. 5 depicts one embodiment of logic for auto-locating structures within a data center and for combining the auto-located structure information with power, temperature, etc., information to holistically monitor and manage operation of the data center, in accordance with one or more aspects of the present invention.

The data (i.e., IP or MAC address, X location and Y location of each identification unit) obtained employing the processing of FIGS. 2 & 3 may be organized in a data matrix for, for example, storage by a host computer of the monitoring unit, or output to a visual display unit or printer. As shown in FIG. 5, the auto-location data may also be automatically, or on command, combined with server/environmental information for the data center to provide graphical data relating to (for example) server power consumption, air flow and air temperatures within the data center room, as well as environmental data (e.g., computer room air-conditioning unit air flows) to various locations within the data center room. These displays may be in the form of a hardcopy output via a printer or a real-time visual display. Further, the data may be employed to determine how effectively the servers within the data center room are being cooled. If desired, the data may also be exported to an expert system to aid in determining an improved arrangement of electronics racks and computer room air-conditioning units to optimize cooling and minimize the energy expended within the data center to provide the cooling.

In the detailed example of FIG. 5, auto-location data is first obtained and stored, including, the data center room dimensions 500, and the location of RFID identification units for, for example, both the air inlet and air outlet sides of electronics racks numbered R1 . . . Rn within the data center 505. In this example, an RFID identification unit is thus employed at the air inlet side of an electronics rack, and another RFID identification unit is employed at the air outlet side of the electronics rack. This allows the front-to-back orientation of the electronics rack to be identified and correlated with other data, as described below. Electronics rack dimension information may also be sent out by the individual RFID identification units, or be obtained from a database with the electronics rack/frame details listed for each rack number or each type of electronics rack (as well as for each type of computer room air-conditioning unit) 510. In this embodiment, perforated tile RFID unit location information is next obtained 515. This assumes that the data center room is an embodiment wherein cool air is introduced through perforated tiles, for example, to a cooling aisle defined by aligned cooling racks. In one example, each perforated tile may be a perforated floor tile having an associated RFID identification unit. Next, the computer room air-conditioning (CRAC) RFID unit location information is obtained 520, for example, commensurate with obtaining the X,Y location information for the electronic rack identification units or subsequent thereto. A graphics module is then employed to automatically draw the data center room with the electronics racks, CRACs and perforated tiles illustrated at their appropriate X,Y locations within the data center room depiction 525. The graphics module may comprise, for example, Visio, offered by Microsoft Corp., or Illustrated, offered by Adobe Systems Incorporated. As noted, this auto-location data can also be merged with existing server/environment data to obtain a more holistic view of the data center room.

Continuing with FIG. 5, rack data from a server system level logic program, such as PowerExecutive™, offered by International Business Machines Corporation of Armonk, N.Y., may be obtained from each rack 530. Specifically, rack power, fan speeds, rack air flow, rack air inlet temperature, rack air outlet temperature, server microprocessor diode temperatures, other miscellaneous temperatures for DIMMs, disk drives, etc., may be obtained, and gathered, for example, by the monitoring unit described above. Additionally, the CRAC inlet and exit temperatures are obtained, as well as the perforated tile air temperatures 535. If desired, the CRAC flow rate may also be obtained via energy balance or from knowledge of the CRAC fan speed. The information collected may then be graphically plotted 540, including, for example a basic data center layout, the various air temperatures, rack powers, rack air flows, CRAC flows, etc. Additionally, or alternatively, the collected information may be displayed via a graphical user interface, or printed 545. Further, the collected information may be employed, for example, by an expert system, to provide recommendations and/or guide and an onsite customer engineer (CE) in making adjustments, for example, to solve a hot spot issue. Adjustments might include moving perforated floor tiles, determining whether the CRAC units are working, identifying any gaps between electronics racks, determining the local heat flux, and if too high, moving electronics racks, and/or deploying a rear door heat exchanger.

The detailed description presented above is discussed in terms of program procedures executed on a computer, a network or a cluster of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are automatic machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

Aspects of the invention are preferably implemented in a high level procedural or object-oriented programming language to communicate with a computer. However, the inventive aspects can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention and/or to structure and its components in accordance with a system of the invention.

The invention may also be implemented in a system. A system may comprise a computer that includes a processor and a memory or storage device, an output device such as a video display and/or an input device such as a keyboard or computer mouse. Moreover, a system may comprise an interconnected network of computers. Computers may equally be in stand-alone form (such as the traditional desktop personal computer) or integrated into another environment (such as a partially clustered computing environment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computing environment. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A locating system for a data center comprising:
   n wireless identification units, at least one wireless identification unit of the n wireless identification units being associated with at least one structure of a plurality of structures of the data center, wherein $n \geq 1$;
   a first transceiver unit and a second transceiver unit positioned within the data center along a common plane, at known X,Y locations within the data center, wherein when operational, each transceiver unit transmits a broadcast signal to the wireless identification units, and responsive thereto, receives response signals from the wireless identification units; and
   a monitor unit in communication with the first transceiver unit and second transceiver unit for automatically determining an X,Y location within the data center of the at least one structure of the plurality of structures employing, in part, a first time differential(s) between transmission of a first broadcast signal by the first transceiver unit and responsive thereto, receipt at the first transceiver unit of at least one response signal from the at least one wireless identification unit associated with the at least one structure, and a second time differential(s) between transmission of a second broadcast signal by the second transceiver unit and responsive thereto, receipt at the second transceiver unit of at least one response signal from the at least one wireless identification unit associated with the at least one structure, as well as the known X,Y locations within the data center of the first transceiver unit and the second transceiver unit.

2. The locating system of claim 1, wherein $n \geq 2$, and the plurality of structures are a plurality of electronics racks, and wherein when operational, each wireless identification unit of the n wireless identification units responds to the first broadcast signal and to the second broadcast signal, and the first transceiver unit sends to the monitor unit a transmit time $T_1$ of the first broadcast signal, return times $t_{1,1} \ldots t_{1,n}$ of the n response signals received at the first transceiver unit responsive to the first broadcast signal, and corresponding identifiers for the n wireless identification units responding to the first broadcast signal, and when operational, the second transceiver unit sends to the monitor unit a transmit time $T_2$ of the second broadcast signal, return times $t_{2,1} \ldots t_{2,n}$ of the n response signals received at the second transceiver unit responsive to the second broadcast signal, and corresponding identifiers for the n wireless identification units responding to the second broadcast signal.

3. The locating system of claim 2, wherein the monitor unit comprises locating logic to store location values X1 and X2 for the first transceiver unit and the second transceiver unit, respectively, along the common plane, the common plane being at Y=0, and to determine an X,Y coordinate location for each wireless identification unit of the n wireless identification units within the data center, the locating logic further comprising first radius logic and second radius logic, the first radius logic to determine a distance to the $j^{th}$ wireless identification unit from the first transceiver unit using:

$$r_{1,j} = \frac{V_s \cdot (T_1 - t_{1,j})}{2}$$

wherein:
- $r_{1,j}$=distance from first transceiver unit to $j^{th}$ wireless identification unit,
- $V_s$=propagation velocity of the broadcast signals and response signals,
- $T_1$=transmit time of the first broadcast signal,
- $t_{1,j}$=receipt time of the response signal from the $j^{th}$ wireless identification unit at the first transceiver unit responsive to the first broadcast signal, and and the second radius logic to determine a distance from the second transceiver unit to the $j^{th}$ wireless identification unit using:

$$r_{2,j} = \frac{V_s \cdot (T_2 - t_{2,j})}{2}$$

wherein:
- $r_{2,j}$=distance from second transceiver unit to $j^{th}$ wireless identification unit,
- $T_2$=transmit time of the second broadcast signal,
- $T_{2,j}$=receipt time of the response signal from the $j^{th}$ wireless identification unit at the second transceiver unit responsive to the second broadcast signal; and wherein the locating logic determines the X coordinate of the $j^{th}$ wireless identification unit as follows:

$$X_j = X1 + \frac{X2^2 - X1^2 + r_{1,j}^2 - r_{2,j}^2}{2 \cdot (X2 - X1)}$$

wherein:
- $X_j$=the X coordinate of the $j^{th}$ wireless identification unit within the data center,
- X1=the X coordinate location of the first transceiver unit along the common plane relative to an X,Y origin point within the data center through which the common plane passes,
- X2=the X coordinate location of the second transceiver unit along the common plane relative to the X,Y origin point within the data center, and wherein the locating logic determines the Y coordinate of the $j^{th}$ wireless identification unit as follows:

$$Y_j = \sqrt{r_{1,j}^2 - (X_j - X1)^2}$$

wherein:
- $Y_j$=the Y coordinate location of the $j^{th}$ wireless identification unit within the data center.

4. The locating system of claim 3, wherein each wireless identification unit of the n wireless identification units is associated with a respective electronics rack of the plurality of electronics racks of the data center, and each electronics rack of the plurality of electronics racks has associated therewith at least one wireless identification unit of the n wireless identification units, and wherein the monitor unit further comprises logic to store the X coordinate location and Y coordinate location of the $j^{th}$ wireless identification unit within the data center, to repeat the X,Y locating of each wireless identification unit of the n wireless identification units responding to the first broadcast signal and the second broadcast signal, and to output one of a map or table of X,Y positions within the data center of the n wireless identification units, and hence the respective electronics racks of the plurality of electronics racks.

5. The locating system of claim 1, wherein $n \geq 2$, and the plurality of structures are a plurality of electronics racks, and wherein the common plane is coplanar with a wall of the data center, and wherein at least one wireless identification unit of the n wireless identification units is associated with each electronics rack of the plurality of electronics racks of the data center.

6. The locating system of claim 5, wherein the data center further comprises at least one computer room air conditioning unit, and wherein at least one wireless identification unit of the n wireless identification units is associated with the at least one computer room air conditioning unit to facilitate automated X,Y locating of the at least one computer room air conditioning unit within the data center.

7. The locating system of claim 6, wherein the monitor unit comprises X,Y position determining logic associated with a host computer disposed within at least one electronics rack of the plurality of electronics racks of the data center.

8. The locating system of claim 1, wherein $n \geq 4$, and the plurality of structures are a plurality of electronics racks, and wherein multiple wireless identification units of the n wireless identification units are associated with each electronics rack of the plurality of electronics racks of the data center, and wherein each electronics rack includes a first wireless identification unit disposed at an air inlet side of the electronics rack, and a second wireless identification unit disposed at an air outlet side of the electronics rack.

9. The locating system of claim 8, wherein the monitor unit further comprises logic to map the data center and to illustrate within the map of the data center the plurality of electronics racks including the air inlet sides and air outlet sides thereof.

10. A data center comprising:
- a plurality of electronics racks disposed within the data center;
- a locating system for automated X,Y locating of electronics racks within the data center, the locating system comprising:
  - n wireless identification units, wherein $n \geq 2$, each wireless identification unit of the n wireless identification units being associated with a respective electronics rack of the plurality of electronics racks of the data center, and each electronics rack of the plurality of electronics racks having associated therewith at least one wireless identification unit of the n wireless identification units;

a first transceiver unit and a second transceiver unit positioned within the data center along a common plane at known X,Y locations within the data center, wherein when operational, each transceiver unit transmits a broadcast signal to the n wireless identification units, and receives responsive thereto, response signals from the n wireless identification units; and a monitor unit in communication with the first transceiver unit and the second transceiver unit for automatically determining an X,Y location within the data center of each wireless identification unit employing, in part, first time differentials between transmission of a first broadcast signal by the first transceiver unit and responsive thereto, receipt at the first transceiver unit of response signals from the n wireless identification units, and second time differentials between transmission of a second broadcast signal by the second transceiver unit and responsive thereto, receipt at the second transceiver unit of response signals from the n wireless identification units, as well as the known X,Y locations within the data center of the first transceiver unit and the second transceiver unit.

11. The data center of claim 10, wherein when operational, the first transceiver unit sends to the monitor unit a transmit time $T_1$ of the first broadcast signal, return times $t_{1,1} \ldots t_{1,n}$ of the n response signals received at the first transceiver unit responsive to the first broadcast signal, and corresponding identifiers for the n wireless identification units responding to the first broadcast signal, and when operational, the second transceiver unit sends to the monitor unit a transmit time $T_2$ of the second broadcast signal, return times $t_{2,1} \ldots t_{2,n}$ of the n response signals received at the second transceiver unit responsive to the second broadcast signal, and corresponding identifiers for the n wireless identification units responding to the second broadcast signal.

12. The data center of claim 11, wherein the monitor unit comprises locating logic to store location values X1 and X2 for the first transceiver unit and the second transceiver unit, respectively, along the common plane, the common plane being at Y=0, and to determine an X,Y coordinate location for each wireless identification unit of the n wireless identification units within the data center, the locating logic further comprising first radius logic and second radius logic, the first radius logic to determine a distance to the $j^{th}$ wireless identification unit from the first transceiver unit using:

$$r_{1,j} = \frac{V_s \cdot (T_1 - t_{1,j})}{2}$$

wherein:
$r_{1,j}$=distance from first transceiver unit to $j^{th}$ wireless identification unit,
$V_s$=propagation velocity of the broadcast signals and response signals,
$T_1$=transmit time of the first broadcast signal,
$t_{1,j}$=receipt time of the response signal from the $j^{th}$ wireless identification unit at the first transceiver unit responsive to the first broadcast signal, and and the second radius logic to determine a distance from the second transceiver unit to the $j^{th}$ wireless identification unit using:

$$r_{2,j} = \frac{V_s \cdot (T_2 - t_{2,j})}{2}$$

wherein:
$r_{2,j}$=distance from second transceiver unit to $j^{th}$ wireless identification unit,
$T_2$=transmit time of the second broadcast signal,
$T_{2,j}$=receipt time of the response signal from the $j^{th}$ wireless identification unit at the second transceiver unit responsive to the second broadcast signal; and wherein the locating logic determines the X coordinate of the $j^{th}$ wireless identification unit as follows:

$$X_j = X1 + \frac{X2^2 - X1^2 + r_{1,j}^2 - r_{2,j}^2}{2 \cdot (X2 - X1)}$$

wherein:
$X_j$=the X coordinate of the $j^{th}$ wireless identification unit within the data center,
X1=the X coordinate location of the first transceiver unit along the common plane relative to an X,Y origin point within the data center through which the common plane passes,
X2=the X coordinate location of the second transceiver unit along the common plane relative to the X,Y origin point within the data center, and wherein the locating logic determines the Y coordinate of the $j^{th}$ wireless identification unit as follows:

$$Y_j = \sqrt{r^2_{1,j} - (X_j - X1)^2}$$

wherein:
$Y_j$=the Y coordinate location of the $j^{th}$ wireless identification unit within the data center.

13. The data center of claim 12, wherein the locating logic comprises logic to store the X coordinate location and Y coordinate location of the $j^{th}$ wireless identification unit within the data center, to repeat the X,Y locating of each wireless identification unit of the n wireless identification units responding to the first broadcast signal and the second broadcast signal, and to output one of a map or table of X,Y positions within the data center of the n wireless identification units, and hence the respective electronics racks of the plurality of electronics racks.

14. The data center of claim 10, wherein the common plane is coplanar with a wall of the data center, the monitor unit comprises X,Y positioning determining logic associated with a host computer disposed within at least one electronics rack of the plurality of electronics racks of the data center, and the data center further comprises at least one room air-conditioning unit, and wherein at least one additional wireless identification unit is associated with the at least one computer room air-conditioning unit to facilitate automated X,Y locating of the at least one computer room air-conditioning unit within the data center employing the first and second transceiver units and the monitor unit.

15. The data center of claim 10, wherein multiple wireless identification units of the n wireless identification units are associated with each electronics rack of the plurality of electronics racks of the data center, and wherein each electronics rack includes a first wireless identification unit disposed at an air inlet side thereof, and a second wireless identification unit disposed at an air outlet side thereof, and wherein the monitor unit further comprises logic to map the data center and to illustrate within the mapped data center the plurality of electronics racks, including the air inlet sides and air outlet sides thereof.

16. An electronics rack locating method for a data center comprising:
- providing an X,Y locating system for the data center, the providing including:
  - associating n wireless identification units with electronics racks of the data center, wherein n≧2, each wireless identification unit being associated with a respective electronics rack of a plurality of electronics racks of the data center, and each electronics rack of the plurality of electronics racks having associated therewith at least one wireless identification unit of the n wireless identification units,
  - disposing a first transceiver unit and a second transceiver unit within the data center along a common plane at known X,Y locations within the data center, and
  - providing a monitor unit in communication with the first transceiver unit and the second transceiver unit for automatically determining an X,Y location within the data center of each respective electronics rack of the plurality of electronics racks; and
- transmitting by the first transceiver unit a first broadcast signal to the n wireless identification units, and responsive thereto, receiving at the first transceiver unit response signals from the n wireless identification units associated with the electronics racks to be located;
- determining first time differentials between transmission of the first broadcast signal by the first transceiver unit and receipt at the first transceiver unit of the respective response signals from the n wireless identification units associated with the electronics racks;
- transmitting a second broadcast signal from the second transceiver unit to the n wireless identification units, and responsive thereto, receiving at the second transceiver unit response signals from the n wireless identification units associated with the electronics racks to be located;
- determining second time differentials between transmission of the second broadcast signal by the second transceiver unit and receipt at the second transceiver unit of the respective response signals from the n wireless identification units associated with the electronics racks; and
- employing the first time differentials and the second time differentials, as well as the known X,Y locations within the data center of the first transceiver unit and the second transceiver unit to automatically determine X,Y locations within the data center of the n wireless identification units, and hence of the respective electronics racks.

17. The method of claim 16, wherein when operational, the first transceiver unit sends to the monitor unit a transmit time $T_1$ of the first broadcast signal, return times $t_{1,1} \ldots t_{1,n}$ of the n response signals received at the first transceiver unit responsive to the first broadcast signal, and corresponding identifiers for the n wireless identification units responding to the first broadcast signal, and when operational, the second transceiver unit sends to the monitor unit a transmit time $T_2$ of the second broadcast signal, return times $t_{2,1} \ldots t_{2,n}$ of the n response signals received at the second transceiver unit responsive to the second broadcast signal, and corresponding identifiers for the n wireless identification units responding to the second broadcast signal.

18. The method of claim 17, wherein the monitor unit comprises locating logic to store location values X1 and X2 for the first transceiver unit and the second transceiver unit, respectively, along the common plane, the common plane being at Y=0, and to determine an X,Y coordinate location for each wireless identification unit of the n wireless identification units within the data center, the locating logic further comprising first radius logic and second radius logic, the first radius logic to determine a distance to the $j^{th}$ wireless identification unit from the first transceiver unit using:

$$r_{1,j} = \frac{V_s \cdot (T_1 - t_{1,j})}{2}$$

wherein:
- $r_{1,j}$=distance from first transceiver unit to $j^{th}$ wireless identification unit,
- $V_s$=propagation velocity of the broadcast signals and response signals,
- $T_1$=transmit time of the first broadcast signal,
- $t_{1,j}$=receipt time of the response signal from the $j^{th}$ wireless identification unit at the first transceiver unit responsive to the first broadcast signal, and and the second radius logic to determine a distance from the second transceiver unit to the $j^{th}$ wireless identification unit using:

$$r_{2,j} = \frac{V_s \cdot (T_2 - t_{2,j})}{2}$$

wherein:
- $r_{2,j}$=distance from second transceiver unit to $j^{th}$ wireless identification unit,
- $T_2$=transmit time of the second broadcast signal,
- $T_{2,j}$=receipt time of the response signal from the $j^{th}$ wireless identification unit at the second transceiver unit responsive to the second broadcast signal; and wherein the locating logic determines the X coordinate of the $j^{th}$ wireless identification unit as follows:

$$X_j = X1 + \frac{X2^2 - X1^2 + r_{1,j}^2 - r_{2,j}^2}{2 \cdot (X2 - X1)}$$

wherein:
- $X_j$=the X coordinate of the $j^{th}$ wireless identification unit within the data center,
- X1=the X coordinate location of the first transceiver unit along the common plane relative to an X,Y origin point within the data center through which the common plane passes,
- X2=the X coordinate location of the second transceiver unit along the common plane relative to the X,Y origin point within the data center, and wherein the locating logic determines the Y coordinate of the $j^{th}$ wireless identification unit as follows:

$$Y_j = \sqrt{r^2_{1,j} - (X_j - X1)^2}$$

wherein:
- $Y_j$=the Y coordinate location of the $j^{th}$ wireless identification unit within the data center.

19. The method of claim 18, wherein the locating logic further comprises logic to store the X coordinate location and Y coordinate location of the $j^{th}$ wireless identification unit within the data center, to repeat the X,Y locating of each wireless identification unit of the n wireless identification units responding to the first broadcast signal and the second broadcast signal, and to output one of a map or table of X,Y positions within the data center of the n wireless identification units, and hence the respective electronics racks of the plurality of electronics racks.

20. The method of claim 16, wherein the common plane is coplanar with a wall of the data center, the monitor unit comprises X,Y positioning determining logic associated with a host computer disposed within at least one electronics rack of the plurality of electronics racks of the data center, and the data center further comprises at least one room air-conditioning unit, and wherein the method further comprises providing at least one additional wireless identification unit associated with the at least one room air-conditioning unit to facilitate automated X,Y locating of the at least one room air-conditioning unit within the data center employing the first and second transceiver units and the monitor unit, and wherein multiple wireless identification units of the n wireless identification units are associated with each electronics rack of the plurality of electronics racks of the data center, and wherein each electronics rack includes a first wireless identification unit disposed at an air inlet side thereof, and a second wireless identification unit disposed at an air outlet side thereof, and wherein the method further comprises mapping the data center and illustrating within the map of the data center the plurality of electronics racks, including the air inlet sides and air outlet sides thereof.

* * * * *